United States Patent
Saleri et al.

(10) Patent No.: US 9,710,766 B2
(45) Date of Patent: Jul. 18, 2017

(54) IDENTIFYING FIELD DEVELOPMENT OPPORTUNITIES FOR INCREASING RECOVERY EFFICIENCY OF PETROLEUM RESERVOIRS

(75) Inventors: Nansen G. Saleri, Houston, TX (US); Robert M. Toronyi, Danville, CA (US); Joey D. Broussard, Houston, TX (US)

(73) Assignee: QRI GROUP, LLC, Houston, TX (US)

( * ) Notice: Subject to any disclaimer, the term of this patent is extended or adjusted under 35 U.S.C. 154(b) by 504 days.

(21) Appl. No.: 13/282,282

(22) Filed: Oct. 26, 2011

(65) Prior Publication Data
US 2013/0110571 A1 May 2, 2013

(51) Int. Cl.
G01V 1/40 (2006.01)
G01V 3/18 (2006.01)
G01V 5/04 (2006.01)
G01V 9/00 (2006.01)
G06Q 10/04 (2012.01)
G01V 1/50 (2006.01)

(52) U.S. Cl.
CPC ............... G06Q 10/04 (2013.01); G01V 1/50 (2013.01)

(58) Field of Classification Search
CPC ............. G01V 1/50; G01V 1/48; G01V 11/00
USPC .......................................................... 702/6
See application file for complete search history.

(56) References Cited

U.S. PATENT DOCUMENTS

| | | | |
|---|---|---|---|
| 3,035,440 A | 5/1962 | Reed | |
| 5,984,010 A * | 11/1999 | Elias et al. | 166/272.3 |
| 6,101,447 A | 8/2000 | Poe | |
| 7,079,952 B2 | 7/2006 | Thomas et al. | |
| 7,289,942 B2 | 10/2007 | Yang et al. | |
| 7,445,041 B2 | 11/2008 | O'Brien | |
| 7,556,099 B2 * | 7/2009 | Arthur et al. | 166/272.3 |
| 7,798,219 B1 * | 9/2010 | Harnoy | 166/270.1 |
| 7,890,264 B2 | 2/2011 | Elphic | |
| 7,963,327 B1 * | 6/2011 | Saleri et al. | 166/252.1 |
| 8,145,427 B1 | 3/2012 | Saleri et al. | |
| 8,145,428 B1 * | 3/2012 | Saleri et al. | 702/9 |

(Continued)

OTHER PUBLICATIONS

Rivas et al., "Ranking Reservoirs for Carbon Dioxide Flooding Processes", 1994.*

(Continued)

*Primary Examiner* — Michael Nghiem
(74) *Attorney, Agent, or Firm* — Workman Nydegger

(57) ABSTRACT

Performing a Recovery Design Assessment™ (RDA™) for a petroleum producing field provides a novel indicator and metric that is designed to assess how to improve recovery efficiency of a petroleum producing field. A combination of global benchmark analysis and reservoir management assessment is utilized to identify areas of reservoir management that can be improved to increase recovery efficiency. Global benchmark analysis can include comparing a recovery efficiency for a petroleum reservoir to that of other benchmark petroleum reservoirs to indicate if alterations to recovery design or developments plans or reservoir management optimizations are to be pursued. Management of the petroleum reservoir is assessed to identify recovery obstacles potentially reducing recovery efficiency. Development opportunities for overcoming recover obstacles can be implemented to increase recovery efficiency.

21 Claims, 7 Drawing Sheets

(56) References Cited

U.S. PATENT DOCUMENTS

| | | | |
|---|---|---|---|
| 8,880,422 B1* | 11/2014 | Lehmann et al. | 705/7.38 |
| 2001/0015133 A1* | 8/2001 | Sakai et al. | 95/273 |
| 2001/0037983 A1* | 11/2001 | Takahashi et al. | 210/776 |
| 2002/0013687 A1 | 1/2002 | Ortoleva | |
| 2002/0120429 A1 | 8/2002 | Ortoleva | |
| 2003/0225606 A1* | 12/2003 | Raghuraman et al. | 705/7 |
| 2004/0015376 A1 | 1/2004 | Zhu et al. | |
| 2004/0158406 A1 | 8/2004 | Harrison | |
| 2004/0220846 A1 | 11/2004 | Cullick | |
| 2005/0038603 A1 | 2/2005 | Thomas et al. | |
| 2005/0149307 A1 | 7/2005 | Gurpiner et al. | |
| 2005/0209912 A1 | 9/2005 | Veeningen et al. | |
| 2006/0224369 A1 | 10/2006 | Yang et al. | |
| 2006/0289157 A1 | 12/2006 | Rao | |
| 2007/0016389 A1 | 1/2007 | Ozgen | |
| 2007/0028417 A1 | 2/2007 | Emmitt | |
| 2007/0143025 A1 | 6/2007 | Valdez et al. | |
| 2007/0284107 A1* | 12/2007 | Crichlow | 166/302 |
| 2008/0052097 A1 | 2/2008 | Bouzas et al. | |
| 2008/0091283 A1 | 4/2008 | Balci et al. | |
| 2008/0252898 A1 | 10/2008 | Pfaff | |
| 2008/0262898 A1 | 10/2008 | Tonchev et al. | |
| 2009/0005630 A1* | 1/2009 | Yokoyama et al. | 588/321 |
| 2009/0037115 A1* | 2/2009 | Magill et al. | 702/14 |
| 2009/0084545 A1 | 4/2009 | Banerjee et al. | |
| 2009/0133871 A1 | 5/2009 | Skinner et al. | |
| 2009/0313772 A1* | 12/2009 | Talley | 15/3.5 |
| 2010/0057418 A1 | 3/2010 | Li et al. | |
| 2010/0082142 A1 | 4/2010 | Usadi et al. | |
| 2010/0204972 A1* | 8/2010 | Hsu et al. | 703/10 |
| 2010/0300682 A1* | 12/2010 | Thakur et al. | 166/250.01 |
| 2011/0014088 A1* | 1/2011 | Zubrin et al. | 422/105 |
| 2011/0067443 A1* | 3/2011 | Martinez et al. | 62/620 |
| 2011/0168391 A1* | 7/2011 | Saleri et al. | 166/250.15 |
| 2011/0290479 A1 | 12/2011 | Izgec | |
| 2012/0101759 A1* | 4/2012 | Rai et al. | 702/85 |
| 2012/0232865 A1* | 9/2012 | Maucec et al. | 703/2 |
| 2012/0292055 A1* | 11/2012 | Swist | 166/401 |
| 2013/0048279 A1* | 2/2013 | Appel et al. | 166/275 |
| 2013/0110474 A1 | 5/2013 | Saleri | |
| 2013/0110524 A1 | 5/2013 | Saleri et al. | |
| 2013/0110563 A1 | 5/2013 | Saleri | |
| 2013/0151159 A1* | 6/2013 | Pomerantz et al. | 702/11 |
| 2013/0161502 A1* | 6/2013 | Pomerantz et al. | 250/255 |
| 2013/0338987 A1* | 12/2013 | Cheng et al. | 703/10 |
| 2015/0337631 A1 | 11/2015 | Matringe et al. | |
| 2015/0346010 A1 | 12/2015 | Matringe et al. | |

OTHER PUBLICATIONS

Jerry Ham, "Ranking of Texas Reservoirs for Application of Carbon Dioxide Miscible Displacement", Apr. 1996.*
Saleri et al., "Engineering Control in Reservoir Simulation: Parts I and II", SPE 18305, 1988.
Saleri et al., "Data and Data Hierarchy", SPE 21369, pp. 1286-1293, Dec. 1992.
Saleri, "Reservoir Performance Forecasting: Acceleration by Parallel Planning", JPT, pp. 652-657, Jul. 1993.
Saleri, "'Learning' Reservoirs: Adapting to Disruptive Technologies", JPT, pp. 57-60, Mar. 2002.
Saleri et al., "The Expanding Role of the Drill Bit in Shaping the Subsurface", JPT, pp. 53-58, Dec. 2003.
Saleri et al., "Shaybah-220: A Maximum-Reservoir-Contact (MRC) Well and Its Implications for Developing Tight-Facies Reservoirs", SPE Reservoir Evaluation & Engineering, pp. 316-320, Aug. 2004.
Saleri, "Reservoir Management Tenets: Why They Matter to Sustainable Supplies", JPT, pp. 28-30, Jan. 2005.
Saleri, "Tenets and Diagnostics in Modern Reservoir Management", 8th International Forum on Reservoir Simulation, Jun. 2005, Stressa, Italy.
Saleri, "The Next Trillion: Anticipating and Enabling Game-Changing Recoveries", JPT, Apr. 2006.
Saleri, "Haradh III: A Milestone for Smart Fields", JPT, Nov. 2006.
Saleri, "Dawn in the Desert: Saudi High Tech Paying Off at Ghawar", Energy Tribune, pp. 15-17, Sep. 2007.
Helman, "The Octopus", Forbes Energy & Genius, pp. 454-451, Nov. 24, 2008.
U.S. Appl No. 12/392,891, filed Feb. 25, 2009, Office action dated Dec. 18, 2010.
U.S. Appl No. 12/392,891, filed Feb. 25, 2009, Notice of Allowance dated Mar. 24, 2011.
U.S. Appl No. 12/915,278, filed Oct. 29, 2010, Office Action dated Nov. 7, 2011.
U.S. Appl No. 12/606,027, filed Oct. 26, 2010, Office Action dated Aug. 10, 2011.
U.S. Appl No. 12/606,027, filed Oct. 26, 2009, Final Office Action dated Jan. 19, 2012.
U.S. Appl No. 12/567,361, filed Sep. 25, 2009, Notice of Allowance dated Feb. 2, 2012.
U.S. Appl No. 12/567,404, filed Sep. 25, 2009, Notice of Allowance dated Feb. 7, 2012.
Batavia, "Front-End Loading for Life Cycle Success", Offshore Technology Conference Paper No. OTC-12980; Published Apr. 2001.
BDM-Oklahoma, Inc., "Feasability Study of Heavy Oil Recovery in the United States", U.S. Department of Energy, Document No. NIPER/BDM-0225; Published Mar. 1995.
Burns et al., "Gas Field Development: Automatic Selection of Locations for New Producing Wells", Society of Petroleum Engineers, Document No. SPE-2429; Published 1969.
Fiksel et al., "Measuring Progress Towards Sustainability Principles, Process, and Best Practices", 1999 Greening of Industry Network Conference Best Practice Proceedings.
Freudenrich, Ph.D., Craig, and Jonathan Strickland, "How Oil Drilling Works" Apr. 12, 2001. HowStuffWorks.com retrieved from WayBack Machine, http://web.archive.org/web/20060418040616/http://science.howstuffworks.com/oil-drilling.htm/printable.
Schlumberger.com retrieved from WayBack Machine, http://web.archive.org/web/20071230014516/http://www.slb.com/.
Slide from 2003 Presentation by Joe Ault.
Society of Petroleum Engineers, "Petroleum Resources Management System"; SPE/World Petroleum Council; Published Apr. 2007.
U.S. Appl. No. 12/915,278, filed Oct. 29, 2010, Final Office Action dated Mar. 1, 2012.
U.S. Appl. No. 13/282,297, filed Oct. 26, 2011, Office Action dated Apr. 1, 2013.
U.S. Appl No. 13/282,297, filed Oct. 26, 2011, Final Office Action dated Sep. 11, 2013.
U.S. Appl No. 13/282,297, filed Oct. 26, 2011, Advisory Action dated Nov. 18, 2013.
U.S. Appl No. 13/282,315, filed Oct. 26, 2011, Office Action dated Aug. 18, 2014.
U.S. Appl No. 13/282,272, filed Oct. 26, 2011, Office Action dated Nov. 7, 2014.
U.S. Appl No. 13/282,315, filed Oct. 26, 2011, Office Action dated Feb. 18, 2015.
U.S. Appl No. 13/282,297, filed Oct. 26, 2011, Office Action dated Mar. 16, 2015.
"The Report of the BP U.S. Refiners Independent Safety Review Panel", Jan. 2007.
U.S. Appl No. 12/567,404, filed Sep. 25, 2009, Office Action dated Dec. 8, 2011.
U.S. Appl No. 13/282,315, filed Oct. 26, 2011, Final Office Action dated Jun. 25, 2015.
U.S. Appl No. 13/282,272, filed Oct. 26, 2011, Final Office Action dated Dec. 9, 2015.
U.S. Appl No. 13/282,297, filed Oct. 26, 2011, Final Office Action dated Dec. 30, 2015.
U.S. Appl No. 14/604,330, filed Jan. 23, 2015, Matringe et al.
U.S. Appl No. 14/604,367, filed Jan. 23, 2015, Matringe et al.
U.S. Appl No. 14/836,564, filed Aug. 26, 2015, Mondal et al.
Society of Petroleum Engineers, "Guidelines for the Evaluation of Petroleum Reserves and Resources"; SPE in associate with World Petroleum Congresses and American Association of Petroleum Geologists, 2001; pp. 1-139.

(56) References Cited

OTHER PUBLICATIONS

Cordazzo et al., "Interblock Transmissibility Calculation Analysis for Petroleum Reservoir Simulation", Federal University of Santa Catarina, Nov. 2002, pp. 1-18.
Izgec et al, "Quantifying Reservoir Connectivity, In-Place Volumes, and Drainage-Area Pressures during Primary Depletion"; Elsevier, 2009; Journal of Petroleum Science and Engineering, vol. 69; p. 7-17.
Jolley et al., Reservoir Compartmentalization: An Introduction; Reservoir Compartmentalization; The Geological Society of London, 2010; Special Publications vol. 347; pp. 1-8.
Kabir et al., "Diagnosis and Reservoir Compartmentalization from Measured Pressure/Rate Data during Primary Depletion"; Elsevier, 2009; Journal of Petroleum Science and Engineering, vol. 69, pp. 271-282.
McElroy, "Transient Pressure Analysis in Strip Reservoirs with Linear Skin Discontinuities", Stanford University, 1986, p. 1-58.
Smalley et al., "Reservoir Compartmentalization Assessed with Fluid Compositional Data", Society of Petroleum Engineers, Aug. 1994; SPE Reservoir Engineering, vol. 9 Is. 3; p. 175-180.
Yin "Geomechanics—Reservoir Modeling by Displacement Discontinuity—Finite Element Method" University of Waterloo, 2008, p. 1-141.
U.S. Appl No. 13/282,315, filed Oct. 26, 2011, Office Action dated Mar. 9, 2016.
U.S. Appl No. 13/282,272, filed Oct. 26, 2011, Office Action dated May 19, 2016.
U.S. Appl No. 13/282,272, filed Oct. 26, 2011, Final Office Action dated Aug. 23, 2016.

* cited by examiner

IDENTIFYING FIELD DEVELOPMENT OPPORTUNITIES FOR INCREASING RECOVERY EFFICIENCY OF PETROLEUM RESERVOIRS

CROSS REFERENCE TO RELATED APPLICATIONS

Not Applicable.

BACKGROUND OF THE INVENTION

1. The Field of the Invention

The invention is in the field of petroleum reservoir asset management, more particularly in the field of identifying field development opportunities for petroleum production.

2. The Relevant Technology

Petroleum is a critical fuel source and is the life blood of modern society. There is tremendous economic opportunity in finding and extracting petroleum. Due to a variety of technical and geological obstacles, it is typically impossible to recover all of the petroleum contained in a reservoir. With advancing technologies and increasing economic incentive due to higher crude oil prices, the average petroleum reservoir recovery rate can now approach about 35%. While this represents a significant increase in average total petroleum recovery in recent years, it also means that about 65% of the petroleum found in a typical reservoir remains unrecoverable from an economic and/or technical standpoint.

With regard to productivity, operators typically analyze each individual well to determine the rate of petroleum extraction, or well productivity. However, operators typically do not understand how to evaluate and understand aggregate well activity and productivity for an entire reservoir or oil field, or how to evaluate well activity and productivity across a plurality of reservoirs or oil fields.

Given the high cost of exploration, dwindling opportunities to find new petroleum reservoirs, and the rising cost of petroleum as a commodity, there currently exists a tremendous economic opportunity for organizations to significantly increase both short-term and long-term production across their petroleum reservoirs. Nonetheless, a majority of petroleum in a typical reservoir remains unrecoverable in spite of the high marginal economic benefits of increasing recovery means because there does not currently exist technologically and/or economically predictable ways of increasing recovery.

While the technology may, in fact, exist to increase current production and/or increase total long-term recovery of an organization's petroleum reservoirs, an impediment to implementing an intelligent long-term plan for maximizing current output, extending the life of each reservoir, and increasing total recovery across reservoirs is inadequate knowledge of where to focus the organization's limited resources for optimal production. For example, while a particular reservoir may underperform relative to other reservoirs, which might lead some to neglect further development of the reservoir, the reservoir may, in fact, contain much larger quantities of recoverable petroleum but be under-producing simply due to poor management. Furthermore, organizations may waste resources developing some reservoirs, in which the production gains achieved are disproportionately small compared to the developmental resources expended. The inability to properly diagnose on which reservoirs to focus further development and resources, and to implement an intelligent recovery plan can result in diminished short-term productivity and long-term recovery across the organization's petroleum reservoirs.

In general, those who operate petroleum production facilities typically formulate a recovery strategy for a field and/or reservoir prior to petroleum extraction. For example, an operator can determine how to drill, the number of wells to drill, well placement, what production techniques to use (e.g., material injection), etc. Once the initial recovery strategy is implemented, operators tend to focus on oil well maintenance, including implementing the latest technologies for maximizing well output at the reservoir. Operators often fail, however, to reassess a recovery strategy based on changed circumstances over time, such as, for example, considering the total picture of health and longevity of a field, and how the field performs relative to other fields, both on a short-term and on a long-term basis. This limits an operator's ability to identify subsequent development opportunities. For example, it can be difficult to identify subsequent cost efficient actions that can be taken in active fields to increase petroleum production.

BRIEF SUMMARY OF THE INVENTION

The present invention relates to identifying opportunities for increasing petroleum production and more particularly to methods, systems, and computer program products for identifying field development opportunities for increasing recovery efficiency of petroleum reserves. The concept may euphemistically be called Recovery Design Assessment™ (RDA™). RDA™ is a systematic methodology for accurately identifying Field Development Opportunities (FDOs) for increasing petroleum production.

A Recovery Design Assessment™ (RDA™) is a powerful method for quickly identifying Field Development Opportunities (FDOs) that takes into consideration a global benchmark analysis and reservoir management effectiveness. Field Development Opportunities (FDOs) include drilling a new well in an existing field, adjusting the amount of material injected into an existing well, implementing peripheral water flooding, re-activating an existing well, etc. RDA™ enables engineers, managers, and investors to efficiently and accurately identify new development opportunities for increasing petroleum production of existing fields.

In general, a RDA™ takes into consideration a global benchmark analysis and Reservoir Management Rating™ (RMR™) to identify Key Recovery Obstacles (KROs), and in turn Field Development Opportunities (FDOs) to address the Key Recovery Obstacles (KROs). The global benchmark analysis can include comparing a Geo-Technical Index™ (GTI™) for a field to an Estimated Ultimate Recovery Factor (EURF) for benchmark fields worldwide to determine the field's ideal recovery efficiency.

An RMR™ quantifies the effectiveness of reservoir management for a petroleum reservoir based on metrics, indices, and quality measures addressing elements of reservoir management design. An RMR™ score can be used to benchmark both field development designs and working operations, helping ensure that both short-term and long term-views are consistently maintained. A weighted set of categories used to formulate an RMR™ can include reservoir management design, reservoir appreciation, development and operating plan, reservoir surveillance and monitoring, technology application, and knowledge management. In some embodiments, reservoir management design is weighted 25%, reservoir appreciation is weighted 25%, development and operating plan is weighted 20%, reservoir surveillance and monitoring is weighted 10%, technology application is weighted 15%, and knowledge management is weighted 5%. In some embodiments, categories are further divided into more specific subcategories providing a more detailed formulation of reservoir management effectiveness.

A Geo-Technical Index™ (GTI™) is a recovery potential indicator that captures geologic complexities driving recovery efficiency for a reservoir. In some embodiments, a GTI™ is calculated from a number of factors that capture recovery drivers within a reservoir. In general, the dimensionless GTI™ can be defined by the following equation:

$$GTI™ = n_A \cdot A + n_B \cdot B + n_C \cdot C$$

where,

A=Compartmentalization Factor. The Compartmentalization Factor accounts for compartmentalization and/or discontinuities (vertically and/or horizontally) within a reservoir. Highly compartmentalized or discontinuous reservoirs exhibit lower recovery efficiency.

B=Transmissibility Index. The Transmissibility Index accounts for reservoir thickness, net-to-gross, permeability, and fluid viscosity. Higher transmissibility correlates with higher recovery efficiency.

C=Depth Factor. The Depth Factor accounts for the depth of the reservoir. Shallow reservoirs can exhibit higher recovery efficiency than deeper reservoirs, due to increased time and cost required to drill (hence the ultimate spacing that can be attained), and the time and cost required to monitor and intervene in the reservoir.

n=weight coefficients

An Estimated Ultimate Recovery Factor (EURF) represents a global benchmark to fields of similar geologic complexity that are making use of reservoir management best practices and increased technology. Comparing a GTI™ to an EURF (a global benchmark trend) provides an appropriate estimate of potential gains from improving reservoir management.

Key Recovery Obstacles (KROs) represent those field aspects or characteristics which impede a field from performing in line with the trend of global benchmarks. KROs can be condensed from the RMR™ process. In some embodiments, KROs are categorized as recovery process or infrastructure KROs. KRO analysis can also distinguish between obstacles more significant alterations to a recovery design or development plan and less significant obstacles addressable through reservoir management optimizations.

Field Development Opportunities (FDOs) represent actions to be taken to address the KROs along with resulting production forecasts. FDOs are designed to sustain production plateaus, mitigate field decline rates, and improve long term recovery efficiency. More significant alterations to a field's recovery design, along with accompanying facility upgrades and reservoir management enhancements or increased drilling can be recommended.

A more detailed description of how to perform a Recovery Design Assessment™ (RDA™) for a field and/or reservoir will be described hereafter. Additional details regarding the Recovery Management Rating™ (RMR™), Geo-Technical Index™ (GTI™), Estimated Ultimate Recovery Factor (EURF), Key Recovery Obstacles (KROs), and Field Development Opportunities (FDOs) will also be described hereafter.

A Recovery Design Assessment™ (RDA™) is a process designed to assess the potential of unlocking additional petroleum production from petroleum reservoirs. Embodiments of the invention provide management, engineers and investors with an effective new tool to identify opportunities to extract petroleum reserves with well-recognized financial benefits to involved parties. Notwithstanding its simplicity, indeed as a result of its simplified methodology, the present invention provides a revolutionary new tool that can accurately and efficiently assess the potential of unlocking additional petroleum production which, in turn, permits interested parties to devise more effective and intelligent strategies for implementing petroleum extraction.

A Recovery Design Assessment™ (RDA™) can advantageously be used as part of a more comprehensive reservoir evaluation system and methodology known as Reservoir Competency Asymmetric Assessment™ (or RCAA™), which is discussed more fully below in the Detailed Description.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

I. Introduction

Figure 1:
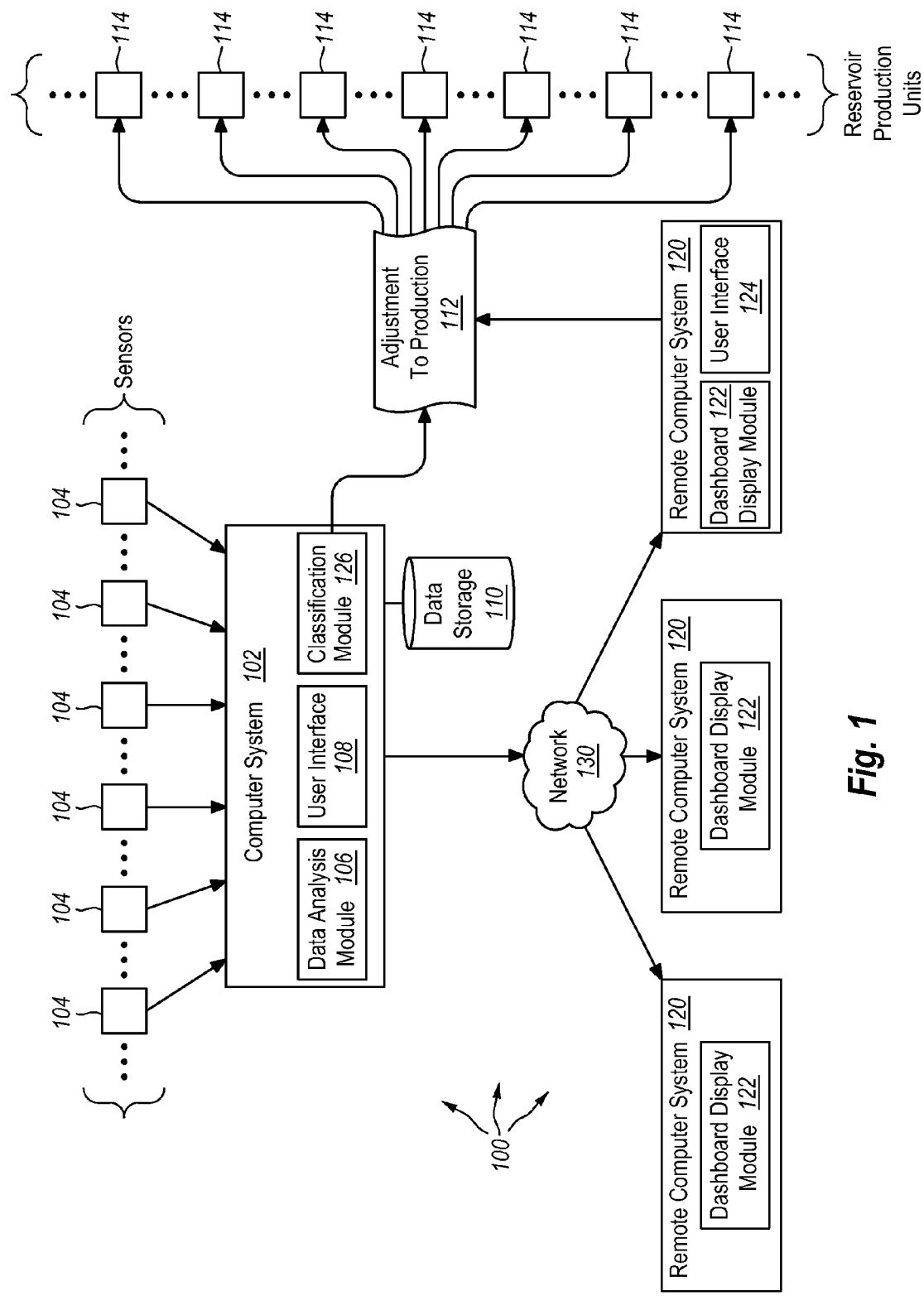
FIG. 1 schematically illustrates exemplary computer-implemented or controlled architecture that can be used to gather, analyze and/or display data gathered from and about a petroleum reservoir.

Embodiments of the invention relate to performing a Recovery Design Assessment™ (RDA™) for a petroleum producing field. Recovery Design Assessment™ (RDA™) is a novel mechanism that is designed to accurately assess the potential of unlocking additional petroleum production from petroleum reservoirs. Embodiments of the invention provide management, engineers and investors with an effective tool to identify opportunities to increase production of a petroleum reservoir with well-recognized financial benefits to involved parties.

Recovery Design Assessment™ (RDA™) can be used in conjunction with, and as an important component of, a larger, more comprehensive system for assessing petroleum reservoir competency. One example of a larger, more comprehensive system developed by the inventors is known as Reservoir Competency Asymmetric Assessment™ (or RCAA™), a description of which is set forth in U.S. Pat. No. 7,963,327, issued Jun. 21, 2011, and entitled "METHOD FOR DYNAMICALLY ASSESSING PETROLEUM RESERVOIR COMPETENCY AND INCREASING PRODUCTION AND RECOVERY THROUGH ASYMMETRIC ANALYSIS OF PERFORMANCE METRICS," which is incorporated herein in its entirety by reference.

By way of background, RCAA™ includes several closely interrelated sub-methods or modules that are employed in concert and sequentially. These methods or modules can be used in forming metrics and indicators regarding petroleum reserves that are used as part of an RDA™, and knowledge gained as part of an RDA™ can be further applied to an iterative application of the RCAA™ of the petroleum reserves. The methods or modules are (i) analyzing and diagnosing the specific and unique features of a reservoir (i.e., its "DNA") using targeted metrics, of which the Recovery Design Assessment™ (RDA™) can be added or modified so as to function as one of the components, (ii) designing a recovery plan for maximizing or increasing current production and ultimate recovery (e.g., increasing recoverable petroleum reserves) from the petroleum reservoir, (iii) implementing the recovery plan so as to increase current production and ultimate recovery of petroleum from the reservoir, and (iv) monitoring or tracking the performance of the petroleum reservoir using targeted metrics and making adjustments to production parameters, as necessary, to maintain desired productivity and recovery.

RCAA™ and RDA™ each rely on intense knowledge gathering techniques, which can include taking direct measurements of the physics, geology, and other unique conditions and aspects of the reservoir and, where applicable, considering the type, number, location and efficacy of any wells that are servicing, or otherwise associated with, the reservoir (e.g., producing wells, dead wells, and observation wells), analyzing the present condition or state of the reservoir using asymmetric weighting of different metrics, and prognosticating future production, recovery and other variables based on a comprehensive understanding of the specific reservoir DNA coupled with the asymmetric weighting and analysis of the data. In some cases, the gathered information may relate to measurements and data generated by others (e.g., the reservoir manager).

In general, RCAA™ is an assessment process which guides both the planning and implementation phases of petroleum recovery. All hydrocarbon assets carry an individual "DNA" reflective of their subsurface and surface features. RCAA™ is an enabling tool for developing and applying extraction methods that are optimally designed to the specifications of individual hydrocarbon reservoirs. Its main value is assisting in the realization of incremental barrels of reserves and production over and above levels being achieved using standard industry techniques. This, in turn, may reduce long-term capital and operating expenses.

According to one embodiment, implementation of RCAA™ spans six interweaving and interdependent tracks: i) Knowledge Systems; ii) Q6 Surveys; iii) Deep Insight Workshops; iv) Q-Diagnostics; v) Gap Analysis; and vi) Plan of Action. The information gathered from these tracks is integrated using modern knowledge-sharing mediums including web-based systems and communities of practice. While the overall business model of RCAA™ includes both technological and non-technological means for gathering the relevant information, the method cannot be implemented without the use of physical processes and machinery for gathering key information. Moreover, implementing a plan of action involves computerized monitoring of well activity. And enhanced reservoir performance results in a physical transformation of the reservoir itself.

A Recovery Design Assessment™ (RDA™) similarly involves physical processes and machinery for gathering key information. Converting such information, which relates to both the geological characteristics of the reservoir as well as operational attributes of the petroleum recovery plan, into a Recovery Design Assessment™ (RDA™) is a transformation of essentially physical data into a diagnostic determination or score of petroleum reservoirs. To the extent that such transformations of data are carried out using a computer system programmed to perform a Recovery Design Assessment™ (RDA™) from the underlying data, more particularly using a processor and system memory, such a computer system is itself a machine.

Because the subsurface plumbing of the reservoir is not homogeneous, it will often be necessary to statistically weight some data points more than others in order to come up with a more accurate assessment of the reservoir. In some cases, outlier data points may simply be anomalies and can be ignored or minimized. In other cases, outliers that show increased recovery efficiency for one or more specific regions of the reservoir may themselves be the ideal and indicate that extraction techniques used in other, less productive regions of the reservoir may need improvement.

Physical processes that utilize machinery to gather data include, for example, 1) coring to obtain down-hole rock samples (both conventional and special coring), 2) taking down-hole fluid samples of oil, water and gas, 3) measuring initial pressures from radio frequency telemetry or like devices, and 4) determining fluid saturations from well logs (both cased hole and open hole). Moreover, once a plan of action is implemented and production and/or recovery from the reservoir are increased, the reservoir is physically transformed from a lower-producing to a higher-producing asset.

Monitoring the performance of the reservoir before, during and/or after implementation of a plan of action involves the use of a computerized system (i.e., part of a "control room") that receives, analyzes and displays relevant data (e.g., to and/or between one or more computers networked together and/or interconnected by the internet). Examples of metrics that can be monitored include 1) reservoir pressure and fluid saturations and changes with logging devices, 2) well productivity and drawdown with logging devices, fluid profile in production and injection wells with logging devices, and oil, gas and water production and injection rates. Relevant metrics can be transmitted and displayed to recipients using the internet or other network. Web based systems can share such data.

FIG. 1 illustrates an exemplary computer-implemented monitoring and analysis system 100 that monitors reservoir performance, analyzes information regarding reservoir performance, displays dashboard metrics, and optionally provides for computer-controlled modifications to maintain optimal oil well performance. Monitoring and analysis system 100 includes a main data gathering computer system 102 comprised of one or more computers located near a reservoir and linked to reservoir sensors 104. Each computer typically includes at least one processor and system memory. Computer system 102 may comprise a plurality of networked computers (e.g., each of which is designed to analyze a sub-set of the overall data generated by and received from the sensors 104). Reservoir sensors 104 are typically positioned at producing oil well, and may include both surface and sub-surface sensors. Sensors 104 may also be positioned at water injection wells, observation wells, etc. The data gathered by the sensors 104 can be used to generate performance metrics (e.g., leading and lagging indicators of production and recovery), including those which relate to the performance of a Recovery Design Assessment™ (RDA™). The computer system 102 may therefore include a data analysis module 106 programmed to establish reservoir metrics from the received sensor data. A user interface 108 provides interactivity with a user, including the ability to input data relating to a real displacement efficiency, vertical displacement efficiency, and pore displacement efficiency. Data storage device or system 110 can be used for long term storage of data and metrics generated from the data, including data and metrics relating to the Recovery Design Assessment™ (RDA™)

According to one embodiment, the computer system 102 can provide for at least one of manual or automatic adjustment to production 112 by reservoir production units 114 (e.g., producing oil wells, water injection wells, gas injection wells, heat injectors, and the like, and sub-components thereof). Adjustments might include, for example, changes in volume, pressure, temperature, and/or well bore path (e.g., via closing or opening of well bore branches). The user interface 108 permits manual adjustments to production 112. The computer system 102 may, in addition, include alarm levels or triggers that, when certain conditions are met, provide for automatic adjustments to production 112.

Monitoring system 100 may also include one or more remote computers 120 that permit a user, team of users, or multiple parties to access information generated by main computer system 102. For example, each remote computer 120 may include a dashboard display module 122 that renders and displays dashboards, metrics, or other information relating to reservoir production. Each remote computer 120 may also include a user interface 124 that permits a user to make adjustment to production 112 by reservoir production units 114. Each remote computer 120 may also include a data storage device (not shown).

Individual computer systems within monitoring and analysis system 100 (e.g., main computer system 102 and remote computers 120) can be connected to a network 130, such as, for example, a local area network ("LAN"), a wide area network ("WAN"), or even the Internet. The various components can receive and send data to each other, as well as other components connected to the network. Networked computer systems and computers themselves constitute a "computer system" for purposes of this disclosure.

Networks facilitating communication between computer systems and other electronic devices can utilize any of a wide range of (potentially interoperating) protocols including, but not limited to, the IEEE 802 suite of wireless protocols, Radio Frequency Identification ("RFID") protocols, ultrasound protocols, infrared protocols, cellular protocols, one-way and two-way wireless paging protocols, Global Positioning System ("GPS") protocols, wired and wireless broadband protocols, ultra-wideband "mesh" protocols, etc. Accordingly, computer systems and other devices can create message related data and exchange message related data (e.g., Internet Protocol ("IP") datagrams and other higher layer protocols that utilize IP datagrams, such as, Transmission Control Protocol ("TCP"), Remote Desktop Protocol ("RDP"), Hypertext Transfer Protocol ("HTTP"), Simple Mail Transfer Protocol ("SMTP"), Simple Object Access Protocol ("SOAP"), etc.) over the network.

Computer systems and electronic devices may be configured to utilize protocols that are appropriate based on corresponding computer system and electronic device on functionality. Components within the architecture can be configured to convert between various protocols to facilitate compatible communication. Computer systems and electronic devices may be configured with multiple protocols and use different protocols to implement different functionality. For example, a sensor 104 at an oil well might transmit data via wire connection, infrared or other wireless protocol to a receiver (not shown) interfaced with a computer, which can then forward the data via fast Ethernet to main computer system 102 for processing. Similarly, the reservoir production units 114 can be connected to main computer system 102 and/or remote computers 120 by wire connection or wireless protocol.

Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code.

II. Performing a Recovery Design Assessment™ for a Petroleum Producing Field

Figure 2:
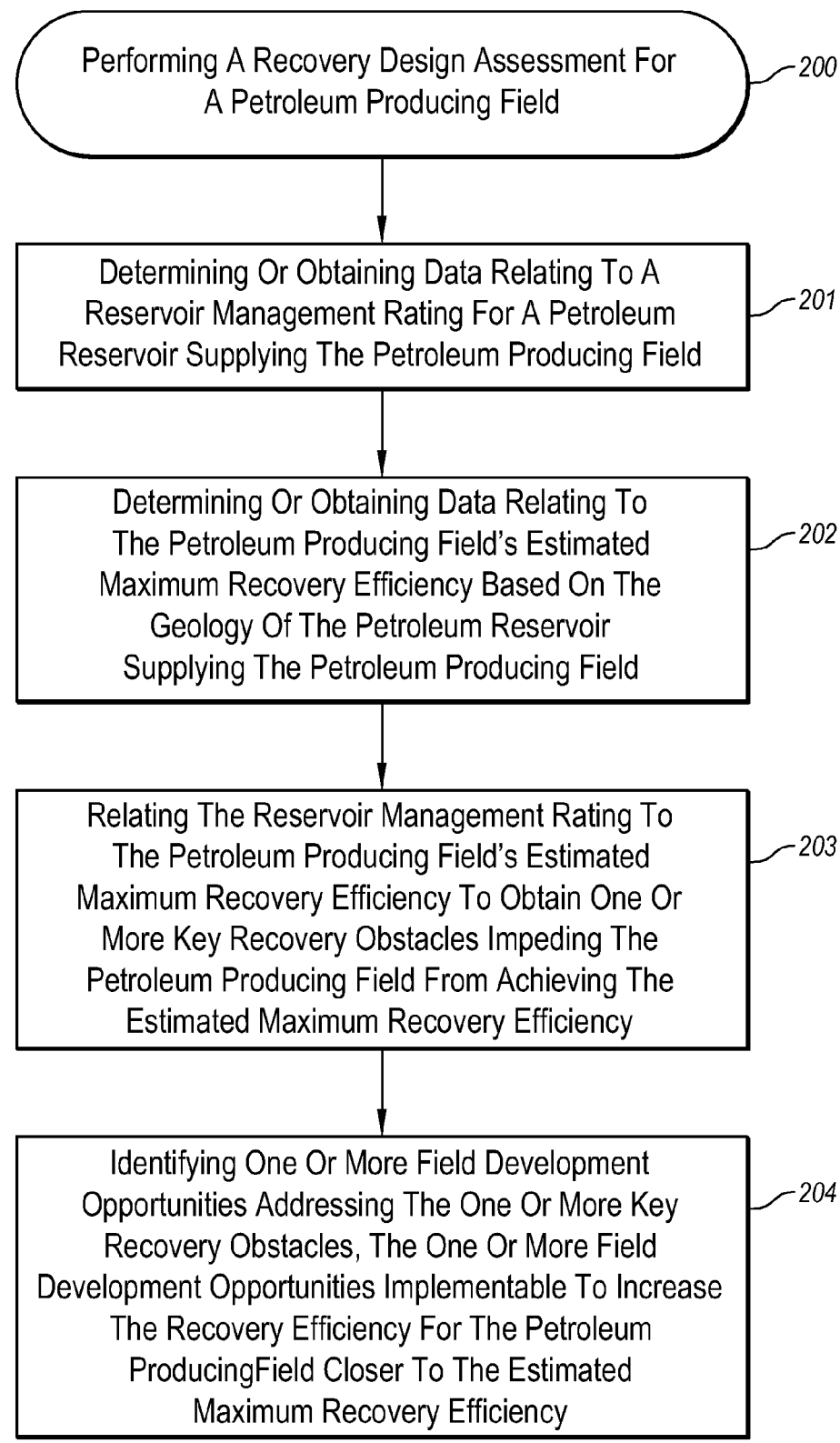
FIG. 2 is a flow diagram that illustrates exemplary acts for performing a Recovery Design Assessment™ (RDA™) for a petroleum producing field.

FIG. 2 is a flow diagram that illustrates general acts or steps of a process 200 for performing a Recovery Design Assessment™ (RDA™) for a petroleum producing field. The process or sequence 200 includes an act or step 201 of determining or obtaining data relating to a Reservoir Management Rating™ (RMR™) for a petroleum reservoir supplying the petroleum producing field. Generally, data relating to an RMR™ can include data used to assess one or more categories of reservoir management effectiveness, such as, for example, reservoir management design, reserves appreciation, development and operation plan, reservoir surveillance and monitoring, technology application, and knowledge management.

The process or sequence 200 includes an act or step 202 of determining or obtaining data relating to the petroleum producing field's estimated maximum recovery efficiency based on the geology of the petroleum reservoir supplying the petroleum producing field. Data related to a petroleum producing field's estimated maximum recovery efficiency can include a Geo-Technical Index™ (GTI™) and an Estimated Ultimate Recovery Factor (EURF). Generally, a Geo-Technical Index™ (GTI™) is a metric that captures geologic complexities that drive recovery efficiency. An Estimated Ultimate Recovery Factor (EURF) indicates efficiency trends for a specified GTI for other fields that used reservoir best practices and technology. A current recovery efficiency for a field and/or reservoir can be compared to an EURF for the reservoir's GTI to indicate an amount of increased recovery efficiency possible for the reservoir.

The process or sequence 200 includes an act or step 203 of relating the Reservoir Management Rating™ (RMR™) to the petroleum producing field's estimated maximum recovery efficiency to obtain one or more Key Recovery Obstacles ("KROs") impeding the petroleum producing field from achieving the estimated maximum recovery efficiency. In some embodiments, KROs are categorized as recovery process or infrastructure KROs. KRO analysis can also distinguish between primary obstacles, which can require more significant alterations to the recovery design or development plan to overcome, and secondary obstacles, which can be addressed through reservoir management optimizations. KROs can include decline of reservoir pressure, reduced sweep efficiency, bypassed petroleum, gas breakthrough, water breakthrough, high depletion rate, sand problems, etc. In some embodiments, KROs are condensed from the results of the RMR™.

Recovery efficiency of a field can be maximized by eliminating or addressing any Key Recovery Obstacles ("KROs"). A series of steps for addressing KROs, along with the resulting production forecast, are referred to as Field Development Opportunities ("FDO's"). FDOs are designed to sustain production plateaus, mitigate field decline rates, and improve recovery efficiency in the long term. The process or sequence 200 includes an act or step 204 of identifying one or more Field Development Opportunities ("FDOs") addressing the one or more Key Recovery Obstacles ("KROs"), the one or more FDOs implementable to increase the recovery efficiency for the petroleum producing field closer to the estimated maximum recovery efficiency.

In some embodiments, Field Development Opportunities ("FDOs") eliminate Key Recovery Obstacles ("KROs"). Increased recovery efficiency can be achieved through elimination of Key Recovery Obstacles ("KROs"). Field Development Opportunities ("FDOs") include injecting gas, increasing a gas injection rate, improving reservoir surveillance, improving drawdown constraints, improving infill drilling, implementing well cycling programs, rate reductions, using sand control screens, injecting water, new well placement, etc. Significant alterations to a field's recovery design, along with accompanying facility upgrades, can be recommended, along with reservoir management enhancements or increased drilling.

Generally, the Reservoir Management Rating™ (RMR™) is a structured investigative approach which quantifies the efficacy of reservoir management design for a petroleum (e.g., oil) reservoir. RMR™ can utilize a set of metrics, indices, and quality measures which address the key elements of reservoir management design, value enhancement, and performance monitoring. Using RMR™, reservoir management gaps can be identified and appropriate solutions recommended.

Figure 3:
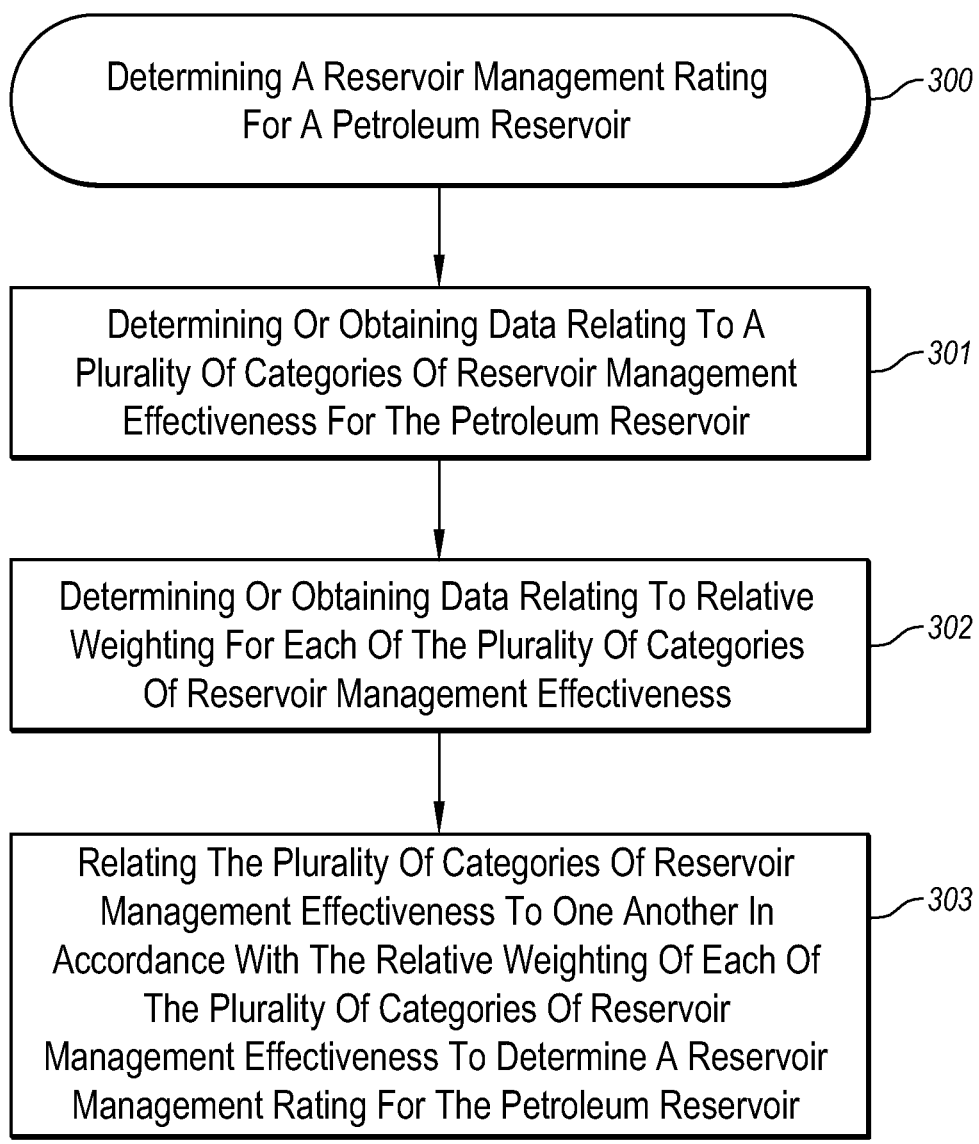
FIG. 3 is a flow diagram that illustrates exemplary acts for determining a Reservoir Management Rating™ (RMR™) for a petroleum reservoir.

FIG. 3 is a flow diagram that illustrates general acts or steps of a process 300 for determining a Reservoir Management Rating™ (RMR™) for a petroleum reservoir. The process or sequence 300 includes an act or step 301 of determining or obtaining data relating to a plurality of categories of reservoir management effectiveness for the petroleum reservoir. The process or sequence 300 includes an act or step 302 of determining or obtaining relating to relative weighting for each of the plurality of categories of reservoir management effectiveness. The process or sequence 300 includes an act or step 303 of relating the plurality of categories of reservoir management effectiveness to one another in accordance with the relative weighting of each of the plurality of categories of reservoir management effectiveness to determine a reservoir management rating (RMR) for the petroleum reservoir.

RMR™ can provide a numerical assessment of relevant performance parameters using closed-form equations, probe questions, and risk factors. RMR™ can quantify the efficacy of a complex process as well as the quality of alternative solutions in a standardized and internally consistent manner. RMR™ metrics consider relevant areas of reservoir performance while filtering out any non-critical data which might add noise to the evaluation process. An RMR™ score can be used to benchmark both field development designs and working operations, ensuring that both short-term and long-term views are consistently maintained. By spanning both design and operating phases it ensures that value is continually planned for and advanced.

In some embodiments, data relating to an RMR™ is used to assess one or more categories of reservoir management effectiveness, such as, for example, reservoir management design, reserves appreciation, development and operation plan, reservoir surveillance and monitoring, technology application, and knowledge management.

Assessing reserve management design can include an assessment of the effectiveness of depletion planning and recovery design. Assessing reserves appreciation can include an assessment of the accuracy of reserves estimation and effectiveness at achieving optimal (e.g., maximum) recovery. Assessing development and operating plan can include an assessment of current reservoir performance relative to recovery design and depletion planning. Assessing reservoir surveillance and monitoring can include an assessment of the planning and implementation of a master surveillance plan and the effectiveness of the plan at measuring reservoir performance indicators. Assessing technology application can include an assessment of an asset management team's receptiveness to new technology. Assessing knowledge management can include an assessment of the asset management team's effectiveness at leveraging corporate intellect.

RMR™ categories can be weighted relative to one another for use in generation of an RMR™ score. For example, reservoir management design can be weighted 25%, reserves appreciation can be weighted 25%, development and operation plan can be weighted 20%, reservoir surveillance and monitoring can be weighted 10%, technology application can be weighted 15%, and knowledge management can be weighted 5%. RMR™ categories can also be subdivided into subcategories. Table 1 depicts an example of categories and corresponding sub-categories related to RMR™.

TABLE 1

| Category | Reservoir Management Design | Reserves Appreciation | Development & Operating Plan | Reservoir Surveillance | Technology Application |
|---|---|---|---|---|---|
| Subcategories | Recovery Design | OIIP Verification | Production Plan Achievement | Master Plan Design | Drilling Technology |
| | Field Depletion Rate | Sweep Efficiency | Pressure Management | Master Plan Implementation | Completion Technology |
| | Well Rate/ Drawdown | Displacement Efficiency | Field Productivity | | Stimulation Technology |
| | Displacement Process Risk | Reserves Verification | Gas Management | | Reservoir Dynamics Technology |
| | Plateau Sustainability | Risk Mitigation | Water Management Drawdown Management Knowledge Management | | |

The categories and subcategories in Table 1 can be used to determine whether an effective reservoir management design is in place and whether it is based on reservoir management best practices. The categories and subcategories can also be used to identify reservoir management deficiencies which, if remedied, represent opportunities to improve field and/or reservoir performance.

Within the reservoir management design category, each subcategory is defined, along with how to maximize the subcategory, as follows:

Recovery Deficiency Indicator™ (RDI™)—measures estimated ultimate recovery efficiency relative to an ideal, or maximum achievable, recovery efficiency. The maximum achievable recovery efficiency is defined by the total amount of moveable oil—or, if adequate data is unavailable, the maximum recovery efficiency achieved by the trend of global benchmark fields as calculated using the Geo-Technical Index (GTI™). RDI can be maximized by a depletion plan targeting recovery of 100% of moveable oil.

Field Depletion Index (FDI)—measures the rate of reserves depletion relative to an optimal reserves life window. By accounting for geologic complexity and reserves risk, the optimal reserves life window is unique for each field. Field production outside this window—above or below—results in a lower score. FDI can be maximized by maintaining field production within the optimal reserves life window.

Well Rate/Drawdown Index (WRDI)—measures the quality of drawdown guidelines applied to constrain well rates. WRDI can be maximized by constraining drawdown based on analog studies, empirical correlations, and reservoir simulation.

Displacement Process Risk Index (DPRI)—measures the downside risk in recovering 2P reserves, and the quality of downside risk analysis. DPRI can be maximized by performance of high quality risk analysis, and by a development plan which minimizes downside risk.

Plateau Sustainability Index (PSI)—measures the amount of EUR recovered while field production is at plateau. PSI can be maximized by a depletion plan which allows for >50% of EUR to be recovered while field production is at plateau.

Within the reserves appreciation category, each subcategory is defined, along with how to maximize the subcategory, as follows:

OIIP Verification Index (OVI)—measures the quality of studies by which OIIP is estimated. Inputs include qualitative assessments of geologic/petrophysical modeling, studies validating critical log parameters, studies verifying net-pay cutoffs and field limits, and comprehensive OIIP studies which incorporate all available data. OVI can be maximized by robust studies in each of these areas.

Sweep Efficiency Index (SEI)—measures total sweep efficiency, areal and vertical, in swept areas (not applicable for reservoirs under depletion drive). SEI can be maximized by a depletion plan which maximizes total sweep efficiency.

Displacement Efficiency Index (DEI)—measures the quality of lab data, field trials, and analyses by which displacement efficiency is estimated (not applicable for reservoirs under depletion drive). DEI can be maximized by a high quality estimate of displacement efficiency through both collection of lab data and performance of field trials.

Reserves Verification Index (RVI)—measures the quality of lab data, field performance data, and analysis by which 2P reserves are estimated. Also accounts for the quality of analysis by which upside and downside reserves are estimated. RVI can be maximized by high quality estimates of 2P reserves, and high quality estimates of upside and downside reserves.

Risk Mitigation Index (RMI)—measures the extent to which 1) key reservoir uncertainties have been identified and ranked, 2) leading indicators for highside and lowside outcomes have been developed, 3) contingency plans for highside and lowside outcomes have been prepared, and 4) lessons learned and best practices have been incorporated into uncertainty analysis. RMI can be maximized by preparation of a high quality uncertainty assessment which incorporates the four factors listed above.

Within the development and operation plan category, each subcategory is defined, along with how to maximize the subcategory, as follows:

Production Plan Achievement Index (PPAI)—measures the variance of actual production relative to 1-year and 5-year forecasts. PPAI can be maximized by actual production data which closely matches the 1-year and 5-year forecasts.

Field Productivity Deficiency Index (FPDI)—measures the decline in average well productivity index (e.g., production divided by drawdown) relative to a target productivity index (such as average productivity index at initial production). FPDI can be maximized by maintaining well productivity indices at their target (or initial) values.

Pressure Management Index (PMI)—measures reservoir pressure relative to a target value, such as bubble point pressure (Pb) or initial pressure (Pi). PMI can be maximized by maintaining reservoir pressure above a target level (such as Pb or Pi).

Gas Management Index (GMI)—measures the impact of gas breakthrough on field performance by calculating 1) the rate of change of producing GOR, 2) the fraction of wells producing above solution GOR, and 3) the fraction of wells shut-in due to high GOR. GMI can be maximized by preventing gas breakthrough.

Water Management Index (WMI)—measures the impact of water breakthrough on field performance by calculating the rate of change of measured water cut. WMI can be maximized by preventing water breakthrough.

Drawdown Management Index (DMI)—measures the effectiveness of drawdown guidelines by calculating the portion of wells producing within their 10% of their design limit. DMI can be maximized by enforcing strict drawdown constraints on all wells.

The reservoir surveillance category accounts for the efficacy of the design, and implementation, of a Master Surveillance Plan. The objectives of a well-designed plan include: (a) integration of reservoir surveillance activities into recovery design and development plan, (b) integration of reservoir surveillance activities into other best practices of reservoir management, (c) customized reservoir surveillance activities tailored to reservoir characteristics and recovery processes, (d) reducing uncertainty in development plan, and planning for early identification of downside leading indicators, (e) field-wide fluid contact monitoring, and (f) allowing for proactive, rather than reactive, reservoir management. Some characteristics of a well designed plan include: (1) permanent down-hole monitoring, (2) real-time data acquisition, (3) good areal and vertical coverage throughout reservoir, (4) dedicated observation wells, (5) drilling of wells in areas of tight spacing to assess sweep, (6) periodic acquisition of core, log, and PVT data, (7) specific definition of methods and frequency of production and injection rates, (8) frequent testing and application of new surveillance technologies, and (9) annual review and updating. The Reservoir Surveillance Index (RSI) can be maximized by designing and implementing a Master Surveillance Plan which meets the objectives and exhibits the characteristics outlined above.

The technology application category reflects the receptiveness of the asset management team to new technology. New technologies are defined as those technologies not previously evaluated or deployed in the reservoir to which RMR™ is being applied. Scores are determined by assessing whether or not new technologies are being deployed, field tested, or evaluated in the four sub-categories given below:

Drilling Technology Index (DTI)—accounts for the implementation of new or alternate drilling technologies.

Completion Technology Index (CTI)—accounts for the implementation of new or alternate completion and production technologies.

Stimulation Technology Index (STI)—accounts for the implementation of new or alternate stimulation and enhanced oil recovery (EOR) technologies.

Reservoir Dynamics Technology Index (RDTI)—accounts for the implementation of new or alternate reservoir characterization technologies.

Technology application sub-categories can be maximized by frequent evaluation, field testing, and deployment of new or alternate technologies in each category.

Figure 4:
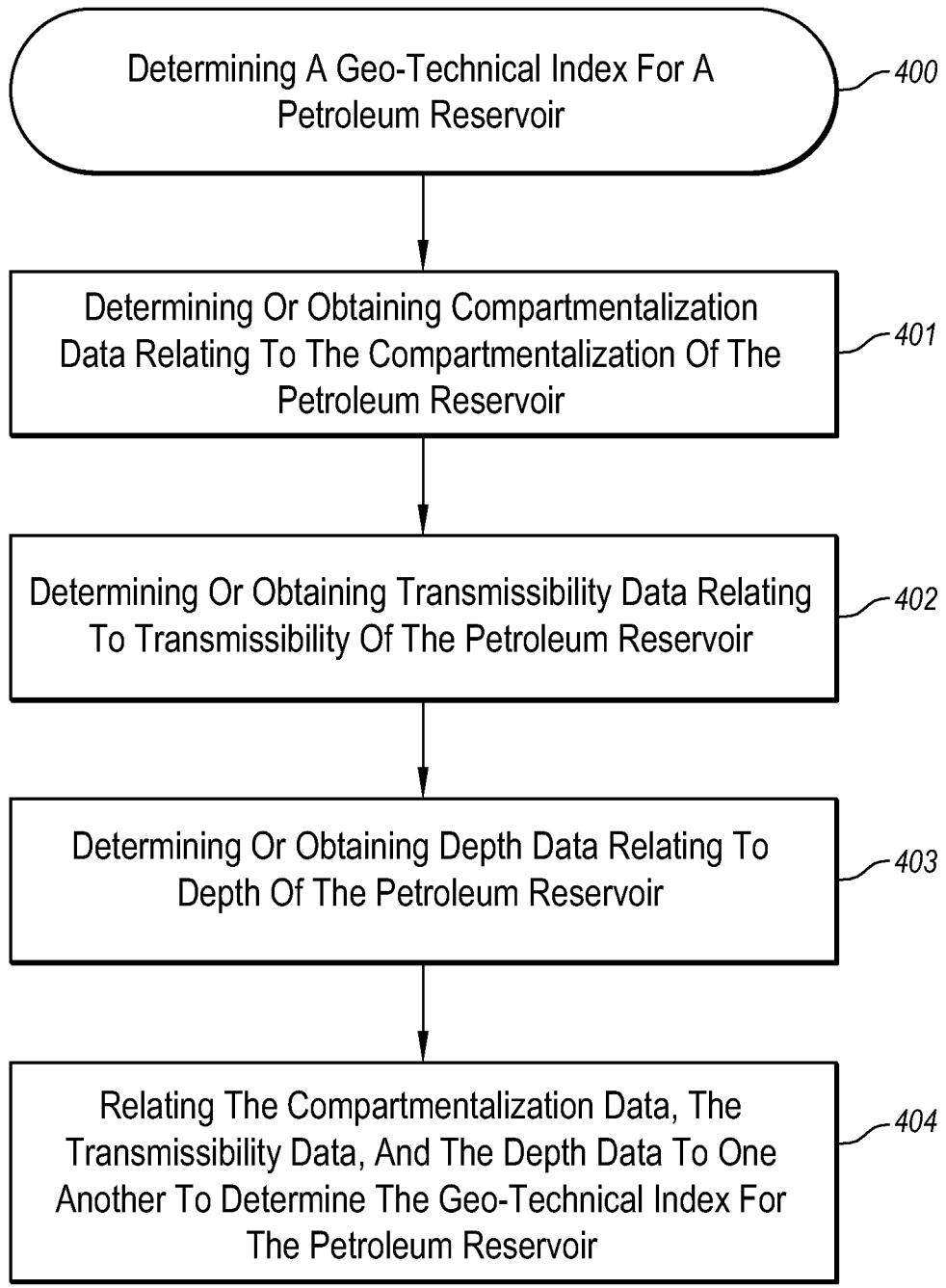
FIG. 4 is a flow diagram that illustrates exemplary acts for determining a Geo-Technical Index™ (GTI™) for a petroleum reservoir.

The knowledge management (KM) category reflects the ability of the asset management team to leverage corporate intellect and capture, correlate, and share mission critical information. Some characteristics of effective Knowledge Management include: (a) validation of data for veracity and accuracy, (b) accessibility of needed project data, (c) real-time data acquisition, (d) collaborative workflow which are multi-disciplinary and data-driven, (e) integration of disparate data sources in meaningful ways, (f) identification and alerting to abnormal trends, and (g) captured organizational memory through best-practice libraries and directories of subject matter experts. The knowledge management category is maximized through data systems which exhibit the above characteristics A Geo-Technical Index™ (GTI™) is a metric that captures geologic complexities that drive recovery efficiency. The GTI™ has a demonstrated ability to capture recovery drivers for reservoirs of various rock types, including elastic and carbonate rock types. FIG. 4 is a flow diagram that illustrates general acts or steps of a process 400 for determining a Geo-Technical Index™ (GTI™) for a petroleum reservoir. The process or sequence 400 includes an act or step 401 of determining or obtaining compartmentalization data relating to the compartmentalization of the petroleum reservoir. The process or sequence 400 includes an act or step 402 of determining or obtaining transmissibility data relating to transmissibility of the petroleum reservoir. The process or sequence 400 includes an act or step 403 of determining or obtaining depth data relating to depth of the petroleum reservoir. The process or sequence 400 includes an act or step 404 of relating the compartmentalization data, the transmissibility data, and the depth data to one another to determine the geo-technical index (GTI) for the petroleum reservoir, such as, for example, according to the following equation:

$$GTI^{TM} = n_A \cdot A + n_B \cdot B + n_C \cdot C$$

where,

A=Compartmentalization Factor. The Compartmentalization Factor accounts for compartmentalization and/or discontinuities (vertically and/or horizontally) within a reservoir. Highly compartmentalized or discontinuous reservoirs exhibit lower recovery efficiency.

B=Transmissibility Index. The Transmissibility Index accounts for reservoir thickness, net-to-gross, permeability, and fluid viscosity. Higher transmissibility correlates with higher recovery efficiency.

C=Depth Factor. The Depth Factor accounts for the depth of the reservoir. Shallow reservoirs can exhibit higher recovery efficiency than deeper reservoirs, due to increased time and cost required to drill (hence the ultimate spacing that can be attained), and the time and cost required to monitor and intervene in the reservoir.

n=weight coefficients

An Estimated Ultimate Recovery Factor (EURF) represents a global benchmark to fields of similar geologic complexity that are making use of reservoir management best practices and increased technology. Comparing a Geo-Technical Index™ (GTI™) to an EURF (a global benchmark trend) provides an appropriate estimate of potential recovery efficiency gains that can be realized from improving reservoir management.

Figure 5:
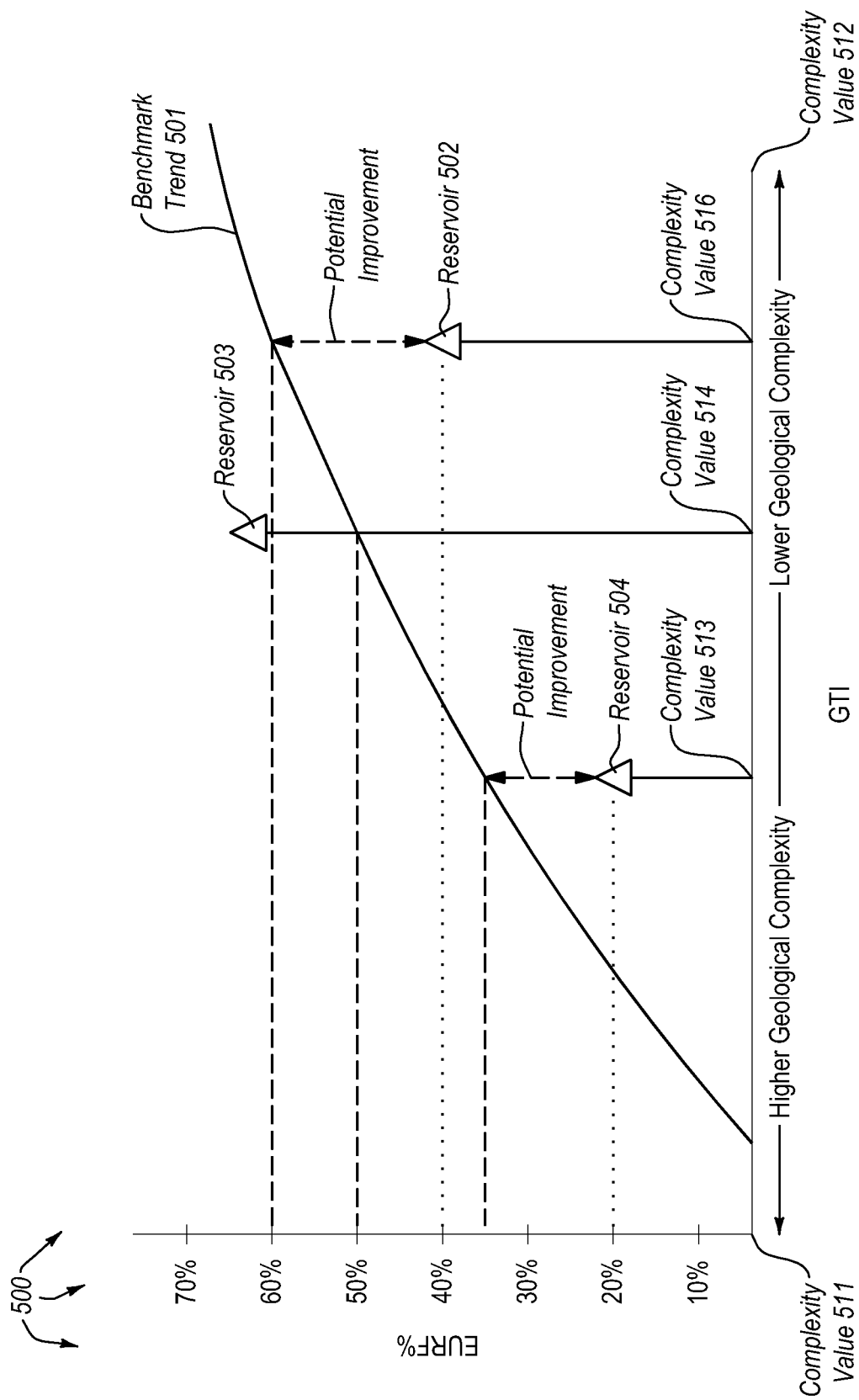
FIG. 5 is a graph of Estimated Ultimate Recovery Factor (EURF) versus Geo-Technical Index™ (GTI™).

FIG. 5 is a graph 500 of Estimated Ultimate Recovery Factor (EURF) versus Geo-Technical Index™ (GTI™). Depicted in graph 500 is benchmark trend 501. Benchmark trend 501 represents an EURF (as a percentage) for reservoirs using best practices and technology. GTI™ represents the geological complexity of a petroleum reservoir from higher complexity at complexity value 511 on the left to lower complexity at complexity value 512 on the right.

As graph 500 depicts, petroleum reservoirs of higher geological complexity tend to have a lower EURF. On the other hand, petroleum reservoirs of lower geological complexity tend to have a higher EURF. Reservoirs having an EURF below benchmark trend 501 are operating less efficiently than other reservoirs of comparable GTI™ used to compute benchmark trend 501.

For example, benchmark trend 501 indicates that reservoirs having a GTI similar to complexity value 513 are to have an EURF of around 35%. However, reservoir 504 has an EURF of around 20%. Thus, implementing Field Development Opportunities ("FDOs") to address Key Recovery Obstacles ("KROs") for reservoir 503 could result in a potential improvement in EURF of around 15%. Similarly, benchmark trend 501 indicates that reservoirs having a GTI™ similar to complexity value 516 are to have an EURF of around 60%. However, reservoir 502 has an EURF of around 40%. Thus, implementing Field Development Opportunities ("FDOs") to address Key Recovery Obstacles ("KROs") for reservoir 502 could result in a potential improvement in EURF of around 20%.

On the other hand, benchmark trend 501 indicates that reservoirs having a GTI similar to complexity value 514 are to have an EURF of around 50%. However, the EURF of reservoir 503 exceeds 50%. Accordingly, resources may be better allocated to address Key Recovery Obstacles ("KROs") for other reservoirs.

Figure 6A:
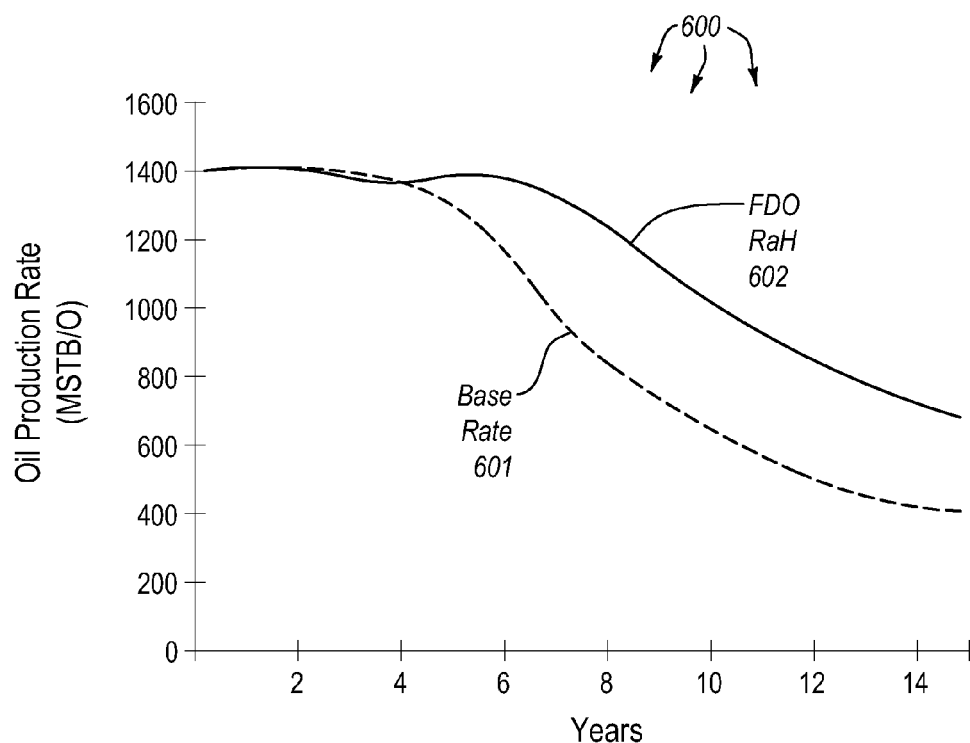
FIG. 6A is a chart illustrating estimated oil production rates for a petroleum producer over a period of time with and without the implementation of Field Development Opportunities (FDOs)
Figure 6B:
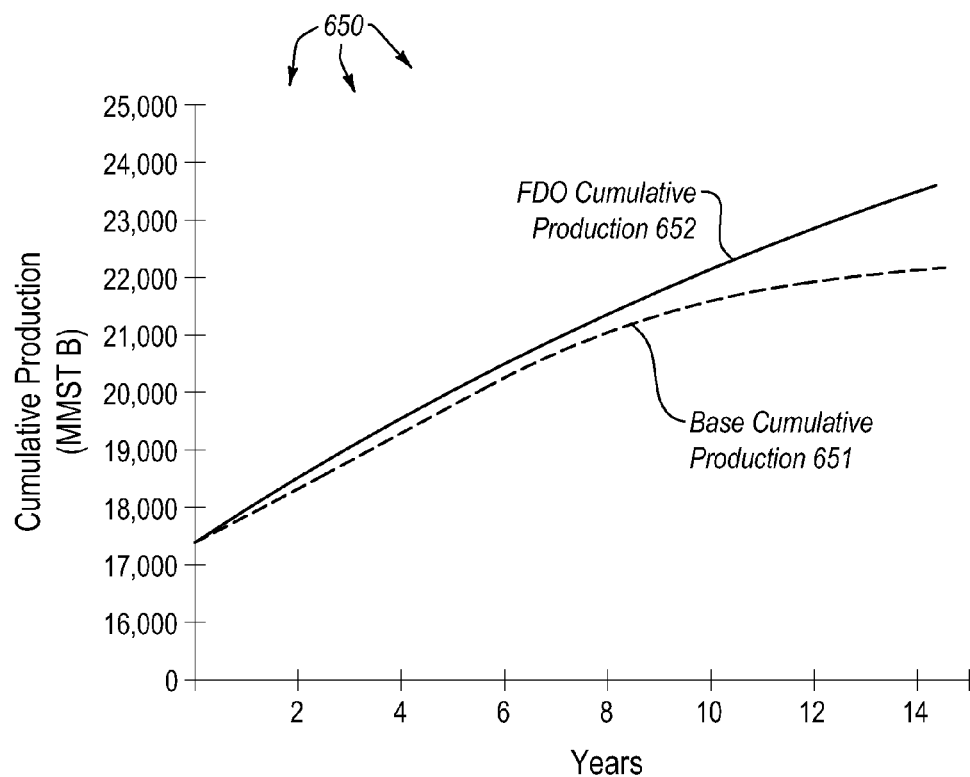
FIG. 6B is a chart illustrating estimated cumulative production for a petroleum producer over a period of time with and without the implementation of Field Development Opportunities (FDOs)

FIG. 6A is a chart 600 illustrating estimated oil production rates for an example petroleum producer over a period of time with and without the implementation of Field Development Opportunities ("FDOs"). As depicted, from around years 4 to 14 of production, FDO rate 602 is higher than the base rate 601 (by around 200 MSTB/d). FIG. 6B is a chart 650 illustrating estimated cumulative production for an example petroleum producer over a period of time with and without the implementation of FDOs. As depicted, after 14 years, FDO cumulative production 652 is higher than base cumulative production 651 (by around 1,000 MMSTB).

Figure 7:
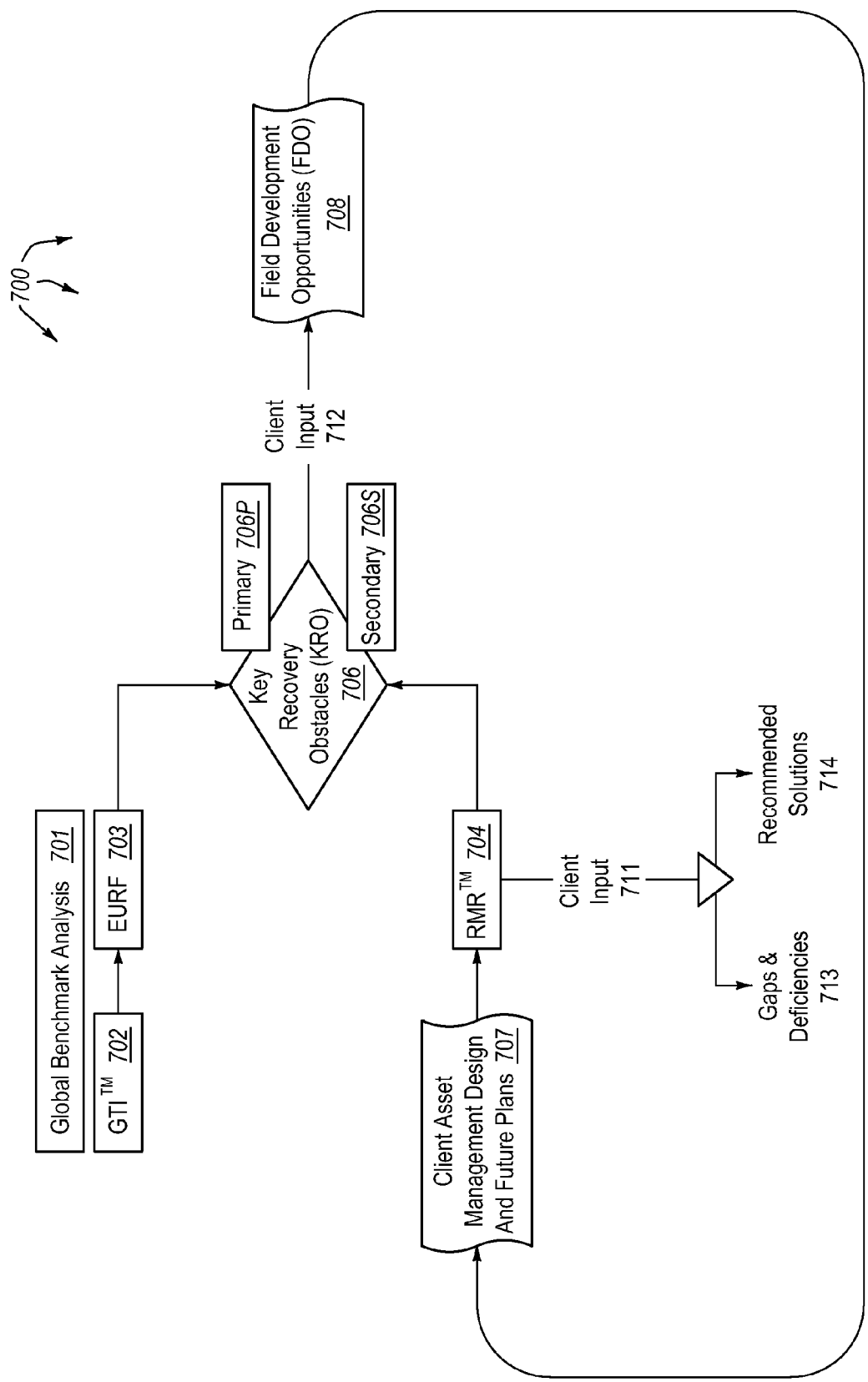
FIG. 7 is a flow diagram that illustrates other exemplary acts for performing a Recovery Design Assessment™ (RDA™) for a reservoir.

FIG. 7 is a flow diagram 700 that illustrates other exemplary acts for performing a Recovery Design Assessment™ (RDA™) for a petroleum reservoir. As depicted, global benchmark analysis 701 includes comparing GTI™ 702 to EURF 703 to determine if recovery efficiency for the petroleum reservoir is in accordance with global trends. RMR™ 704 is performed on client asset management design and future plans 707. In combination with user input 711, gaps and deficiencies 713 and recommended solutions 714 are identified. Key recovery obstacles (KROs) 706, including primary obstacles 706P and secondary obstacles 706S, are identified from the output of global benchmark analysis 701 and RMR™ 704. Client input 712 is used to formulate field development opportunities (FDOs) 708 to address Key recovery obstacles (KROs) 706. Field development opportunities (FDOs) 708 can be used to adjust client asset management design and future plans 707.

In short, the present invention provides a simple, yet powerful, diagnostic tool, Recovery Design Assessment™ (RDA™), that can be used to accurately determine how to improve recovery efficiency at a petroleum reservoir. A combination of global benchmark analysis and reservoir management assessment is utilized to identify areas of reservoir management that can be improved to increase recovery efficiency. The inventiveness of the disclosed methods lies in their simplicity and ease of implementation. Although sophisticated managers and operators of petroleum reservoirs have been assessing capital projects for decades, and there has existed a long-felt need for finding improved and more streamlined methods for assessing opportunities for economically increasing petroleum production, those of skill in the art have overlooked and failed to appreciate the powerful diagnostic power and quick implementation of the methods disclosed herein, which satisfy a long-felt need known in the art but heretofore unsatisfied. Moreover, the accuracy by which one may quickly determine how to increase recover efficiency for a petroleum reservoir is, compared to conventional practices, unpredictable and an unexpected result.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of performing a recovery design assessment for a petroleum producing field in order to identify one or more key recovery obstacles impeding the petroleum producing field from achieving an estimated maximum recovery efficiency and adjusting operation of one or more production units to remove or mitigate the one or more key recovery obstacles and thereby increase a recovery efficiency of the petroleum producing field, the method comprising:

measuring, using one or more sensors placed in a petroleum reservoir supplying the petroleum producing field, physical or geological characteristics of the petroleum reservoir directly or indirectly relating to at least some of reservoir pressure, fluid saturation, well productivity and drawdown, fluid profile, oil production, gas production, water production, injection rate, displacement efficiency, sweep efficiency, bypassed petroleum, gas breakthrough, water breakthrough, depletion rate, compartmentalization, vertical and/or horizontal discontinuity, reservoir thickness, reservoir permeability, permeability, fluid viscosity, reservoir depth, and sand problems;

generating a reservoir management rating for the petroleum reservoir supplying the petroleum producing field based at least in part from data measured by the one or more sensors placed in the petroleum reservoir supplying the petroleum producing field;

generating the estimated maximum recovery efficiency for the petroleum producing field based on an estimated ultimate recovery factor and a geo-technical index incorporating at least some of the one or more physical or geological characteristics of the petroleum reservoir measured by the one or more sensors;

identifying, at least in part from data obtained by the one or more sensors placed in the petroleum reservoir supplying the petroleum producing field and by relating the reservoir management rating to the petroleum producing field's estimated maximum recovery efficiency, the one or more key recovery obstacles that impede the petroleum producing field from achieving the estimated maximum recovery efficiency; and adjusting operation of the one or more production units to remove or mitigate the one or more key recovery obstacles and thereby increase the recovery efficiency, wherein the one or more production units are selected from producing oil wells, water injection wells, gas injection wells, heat injectors, or one or more subcomponents of the one or more production units, and wherein adjusting the operation of the one or more production units is selected from change in volume, change in pressure, change in temperature, change in well bore path, drilling one or more new production units, implementing peripheral water flooding, re-activating an existing well, or shutting down one or more existing production units.

2. The method as recited in claim 1, wherein generating the reservoir management rating comprises obtaining data relating to one or more of: reservoir management design, reserves appreciation, development and operating plan, reservoir surveillance and monitoring, technology application, and knowledge management.

3. The method as recited in claim 1, wherein generating the reservoir management rating comprises obtaining a plurality of different portions of data and assigning a weight to each of portion of data in the plurality of different portions of data.

4. The method as recited in claim 1, wherein the geo-technical index is calculated based on a compartmentalization factor, a transmissibility index, and a depth factor determined for the petroleum producing field.

5. The method as recited in claim 4, wherein the compartmentalization factor accounts for compartmentalization or discontinuities within a reservoir.

6. The method as recited in claim 4, wherein the geo-technical index (GTI) for the petroleum producing field is calculated as follows:

$$GTI = n_a * A + n_b * B + n_c * C$$

where:
A=the compartmentalization factor,
B=the transmissibility index,
C=the depth factor, and
$n_a$, $n_b$, and $n_c$=weighting coefficients.

7. The method as recited in claim 4, wherein the petroleum producing field's estimated maximum recovery efficiency is indicative of a selected recovery efficiency for petroleum producers using designated practices and technology to extract petroleum from petroleum reservoirs having the calculated geo-technical index.

8. The method as recited in claim 1, wherein identifying the one or more key recovery obstacles that impede the petroleum producing field from achieving the estimated maximum recovery efficiency comprises identifying one or more of: a decline of reservoir pressure, a specified loss in sweep efficiency, bypassed petroleum, gas breakthrough, water breakthrough, and a specified depletion rate.

9. The method as recited in claim 1, wherein identifying the one or more key recovery obstacles that impede the petroleum producing field from achieving the estimated maximum recovery efficiency comprises identifying one or more primary factors and one or more secondary factors, the primary factors requiring additional alterations to recovery design or development plan, the secondary factors being addressable through reservoir management optimizations.

10. The method as recited in claim 1, wherein adjusting the operation of the one or more production units comprises one or more manual or automatic adjustments to one or more infrastructure elements of the petroleum producing field or one or more recovery processes, wherein the one or more manual or automatic adjustments extend the amount of time the petroleum producing field can operate at a specified oil production rate.

11. The method as recited in claim 1, wherein adjusting the operation of the one or more production units comprises one or more manual or automatic adjustments to one or more infrastructure elements of the petroleum producing field or one or more recovery processes, wherein the one or more manual or automatic adjustments increase a cumulative output of the petroleum producing field by at least a specified amount over time.

12. In a computing system having a processor and system memory, a method of performing a recovery design assessment for a petroleum producing field in order to identify one or more key recovery obstacles impeding the petroleum producing field from achieving an estimated maximum recovery efficiency and adjusting operation of one or more production units to remove the one or more key recovery obstacles and thereby increase a recovery efficiency of the petroleum producing field, the method comprising:

inputting into the computing system data relating to one or more physical or geological characteristics of a petroleum reservoir supplying the petroleum producing field, the one or more physical or geological characteristics determined at least in part by one or more sensors placed in the petroleum reservoir supplying the petroleum producing field, the one or more physical or geological characteristics of the petroleum reservoir directly or indirectly relating to at least some of reservoir pressure, fluid saturation, well productivity and drawdown, fluid profile, oil production, gas production, water production, injection rate, displacement efficiency, sweep efficiency, bypassed petroleum, gas breakthrough, water breakthrough, depletion rate, compartmentalization, vertical and/or horizontal discontinuity, reservoir thickness, reservoir permeability, fluid viscosity, reservoir depth, and sand problems;

the computing system generating a reservoir management rating for the petroleum reservoir supplying the petroleum producing field based at least in part on the one or more physical or geological characteristics of the petroleum producing field;

the computing system generating the estimated maximum recovery efficiency for the petroleum producing field based at least in part on an estimated ultimate recovery factor and a geo-technical index incorporating at least some of the one or more physical or geological characteristics of the petroleum reservoir measured by the one or more sensors;

the computing system identifying, at least in part from data relating to the one or more physical or geological characteristics of the petroleum producing field, and by relating the reservoir management rating to the petroleum producing field's estimated maximum recovery efficiency, the one or more key recovery obstacles that impede the petroleum producing field from achieving the estimated maximum recovery efficiency;

the computing system determining the one or more field development opportunities to address the one or more key recovery obstacles and thereby increase the recovery efficiency of the petroleum producing field; and adjusting operation of the one or more production units to remove the one or more key recovery obstacles and thereby increase the recovery efficiency, wherein the one or more production units are selected from producing oil wells, water injection wells, gas injection wells, heat injectors, or one or more sub-components of the one or more production units, and wherein adjusting the operation of the one or more production units is selected from change in volume, change in pressure, change in temperature, change in well bore path, drilling one or more new production units, implementing peripheral water flooding, re-activating an existing well, or shutting down one or more existing production units.

13. The method of claim 12, wherein generating the reservoir management rating comprises obtaining data relating to a plurality of categories of reservoir management effectiveness, including obtaining data related to corresponding subcategories within each of the plurality of categories of reservoir management effectiveness.

14. The method of claim 13, wherein generating the reservoir management rating comprises generating a score for each of the plurality of categories of reservoir management effectiveness based on the corresponding subcategories.

15. The method of claim 12, wherein generating the reservoir management rating comprises accessing data relating to a plurality of categories of reservoir management effectiveness comprises accessing data related to one or more of: reservoir management design, reserves appreciation, development plan, operating plan, reservoir surveillance, reservoir monitor, technology application, and knowledge management.

16. A method of performing a recovery design assessment for a petroleum producing field in order to identify one or more key recovery obstacles impeding the petroleum producing field from achieving an estimated maximum recovery efficiency and adjusting operation of one or more production units to remove the one or more key recovery obstacles and thereby increase a recovery efficiency of the petroleum producing field, the method comprising:

measuring, using one or more sensors placed in a petroleum reservoir supplying the petroleum producing field, physical or geological characteristics of the petroleum reservoir directly or indirectly relating to at least some of reservoir pressure, fluid saturation, well productivity and drawdown, fluid profile, oil production, gas production, water production, injection rate, displacement efficiency, sweep efficiency, bypassed petroleum, gas breakthrough, water breakthrough, depletion rate, compartmentalization, vertical and/or horizontal discontinuity, reservoir thickness, reservoir permeability, fluid viscosity, reservoir depth, and sand problems;

generating a reservoir management rating for the petroleum reservoir supplying the petroleum producing field based at least in part from data measured by the one or more sensors placed in the petroleum reservoir supplying the petroleum producing field:

calculating a geotechnical index (GTI) for the petroleum reservoir, wherein calculating the geo-technical index (GTI) comprises:

generating a compartmentalization factor data relating to compartmentalization of or discontinuities within the petroleum reservoir, the compartmentalization of or discontinuities within the petroleum reservoir being measured by the one or more sensors placed in the petroleum reservoir;

generating a transmissibility index relating to transmissibility of petroleum through the petroleum reservoir, wherein the transmissibility of petroleum through the petroleum reservoir is based at least in part from transmissibility data measured by the one or more sensors placed in the petroleum reservoir;

generating a depth factor relating to one or more depths of the petroleum reservoir, the one or more depths being measured by the one or more sensors placed in the petroleum reservoir; and relating the compartmentalization factor, the transmissibility index, and the depth factor to one another;

determining an estimated ultimate recovery factor percentage, wherein the estimated ultimate recovery factor percentage is representative of the estimated maximum recovery efficiency at one or more other petroleum reservoirs having geology similar to the petroleum reservoir;

generating the estimated maximum recovery efficiency for the petroleum reservoir by relating the estimated ultimate recovery percentage to the geo-technical index for the petroleum reservoir;

based at least in part on the reservoir management rating and the estimated maximum recovery for the petroleum reservoir, identifying the one or more key recovery obstacles that impede the petroleum producing field from achieving the estimated maximum recovery efficiency; and adjusting operation of the one or more production units to remove the one or more key recovery obstacles and thereby increase the recovery efficiency, wherein the one or more production units are selected from producing oil wells, water injection wells, gas injection wells, heat injectors, or one or more sub-components of the one or more production units, and wherein adjusting the operation of the one or more production units is selected from change in volume, change in pressure, change in temperature, change in well bore path, drilling one or more new production units, implementing peripheral water flooding, re-activating an existing well, or shutting down one or more existing production units.

17. The method of claim 16, further comprising determining one or more of gaps and deficiencies in the client's asset management design and further plans; and identifying opportunities to address the one or more of the gaps and deficiencies.

18. The method of claim 16, wherein the estimated ultimate recovery factor percentage is a benchmark recovery efficiency for oil fields that use reservoir management best practices and technology.

19. The method of claim 16, wherein the geo-technical index (GTI) is calculated as follows:

$$GTI = n_A \cdot A + n_B \cdot B + n_C \cdot C$$

where,
- A is a compartmentalization factor that accounts for compartmentalization or discontinuities, including vertical and/or horizontal discontinuities, within a reservoir,
- B is a transmissibility Index that accounts for reservoir thickness (net-to-gross), permeability, and fluid viscosity,
- C is a depth factor that accounts for the depth of the reservoir, and
- $n_A$, $n_B$, and $n_C$ are weight coefficients.

20. In a computing system having a processor and system memory, a method of performing a recovery design assessment for a petroleum producing field in order to identify one or more key recovery obstacles impeding the petroleum producing field from achieving an estimated maximum recovery efficiency and adjusting operation of one or more production units to remove the one or more key recovery obstacles and thereby increase a recovery efficiency of the petroleum producing field, the method comprising:

inputting into the computing system data relating to one or more physical or geological characteristics of a petroleum reservoir supplying the petroleum producing field, the one or more physical or geological characteristics of the petroleum reservoir determined at least in part by one or more sensors placed in the petroleum reservoir supplying the petroleum producing field, the one or more physical or geological characteristics of the petroleum reservoir directly or indirectly relating to at least some of reservoir pressure, fluid saturation, well productivity and drawdown, fluid profile, oil production, gas production, water production, injection rate, displacement efficiency, sweep efficiency, bypassed petroleum, gas breakthrough, water breakthrough, depletion rate, compartmentalization, vertical and/or horizontal discontinuity, reservoir thickness, reservoir permeability, fluid viscosity, reservoir depth, and sand problems;

the computing system generating a reservoir management rating for the petroleum reservoir supplying the petroleum producing field based at least in part on the one or more physical or geological characteristics of the petroleum producing field;

the computing system calculating a geo-technical index (GTI) for the petroleum reservoir, wherein calculating the geo-technical index (GTI) comprises:

receiving or generating a compartmentalization factor relating to compartmentalization of or discontinuities within the petroleum reservoir;

receiving or generating a transmissibility index relating to transmissibility of petroleum through the petroleum reservoir;

receiving or generating a depth factor relating to a depth of the petroleum reservoir; and relating the compartmentalization factor, the transmissibility index, and the depth factor to one another;

the computing system determining an estimated ultimate recovery factor percentage, wherein the estimated ultimate recovery factor percentage is representative of the estimated maximum recovery efficiency at one or more other petroleum reservoirs having geology similar to the petroleum reservoir;

the computing system generating the estimated maximum recovery efficiency for the petroleum reservoir by relating the estimated ultimate recovery percentage to the geo-technical index for the petroleum reservoir;

based at least in part on the reservoir management rating and the estimated maximum recovery for the petroleum reservoir, identifying the one or more key recovery obstacles that impede the petroleum producing field from achieving the estimated maximum recovery efficiency; and adjusting operation of the one or more production units to remove the one or more key recovery obstacles and thereby increase the recovery efficiency, wherein the one or more production units are selected from producing oil wells, water injection wells, gas injection wells, heat injectors, or one or more sub-components of the one or more production units, and wherein adjusting the operation of the one or more production units is selected from change in volume, change in pressure, change in temperature, change in well bore path, drilling one or more new production units, implementing peripheral water flooding, re-activating an existing well, or shutting down one or more existing production units.

21. The method of claim 20, wherein the geo-technical index (GTI) is calculated as follows:

$$GTI = n_A \cdot A + n_B \cdot B + n_C \cdot C$$

where,
- A is a compartmentalization factor that accounts for compartmentalization or discontinuities, including vertical and/or horizontal discontinuities, within a reservoir,
- B is a transmissibility Index that accounts for reservoir thickness (net-to-gross), permeability, and fluid viscosity,
- C is a depth factor that accounts for the depth of the reservoir, and
- $n_A$, $n_B$, and $n_C$ are weight coefficients.

* * * * *

UNITED STATES PATENT AND TRADEMARK OFFICE
CERTIFICATE OF CORRECTION

PATENT NO. : 9,710,766 B2
APPLICATION NO. : 13/282282
DATED : July 18, 2017
INVENTOR(S) : Saleri et al.

It is certified that error appears in the above-identified patent and that said Letters Patent is hereby corrected as shown below:

In the Specification

Column 7
Line 8, change "at producing oil well" to --at a producing oil well--

Column 8
Line 51, change "Transmissions media" to --Transmission media--
Lines 52-53, change "carry or desired" to --carry a desired--

Signed and Sealed this
Twenty-second Day of May, 2018

Andrei Iancu
*Director of the United States Patent and Trademark Office*